UNITED STATES PATENT OFFICE.

RICHARD A. TILGHMAN, OF PHILADELPHIA, PENNSYLVANIA.

IMPROVEMENT IN MAKING CHROMIC YELLOW.

Specification forming part of Letters Patent No. 2,910, dated January 16, 1843.

*To all whom it may concern:*

Be it known that I, the undersigned, RICHARD A. TILGHMAN, of the city of Philadelphia, in the county of Philadelphia, in the State of Pennsylvania, have invented a new and useful Improvement in the Manufacture of Chromic Yellow, called "an Improved Method of Manufacturing Chromic Yellow," of which the following is a full and exact description.

The ordinary process of manufacturing chromic yellow is by mixing a solution of chromate of potassa with a solution of the acetate or nitrate of lead, the chromate of lead being thereby precipitated and the acetate or nitrate of potassa left in solution. In this ordinary process it is to be observed that the whole of the oxide of lead is converted into chromate and that the expense of previously converting that oxide into acetate or nitrate must be incurred.

Now, my improvement consists in using the carbonate of lead in place of the solution of the acetate or nitrate of lead commonly employed in the manufacture of chromic yellow. By this substitution the expense of converting the oxide of lead into the acetate or nitrate of lead is avoided, and a given quantity of chromic acid is sufficient to produce a much larger quantity of pigment of good quality than can be obtained by any process for its manufacture heretofore known.

My method of manufacturing chromic yellow according to the improvement I have above stated is by mixing or grinding the carbonate of lead in a solution of chromate or bichromate of potassa or in any other soluble chromate or bichromate, the solution in every case being in excess.

The chemical action resulting from this treatment of the above-named ingredients is as follows: When the carbonate of lead is ground with any soluble chromate or bichromate a double decomposition takes place, the chromic acid uniting with the oxide of lead and forming chromate of lead or chromic yellow, while the carbonic acid unites with the alkali of the soluble chromate or bichromate employed. But this action appears not to take place throughout the entire substance of the particles of the carbonate of lead, but seems to extend to a certain depth beneath their surface only, so that a given portion of the soluble chromate or bichromate employed is sufficient to color from eight to twelve or more times its chemical equivalent of the carbonate of lead, the extent of this coloring action of a given quantity of the chromate or bichromate being greater or less, according as the particles of the carbonate of lead are coarser or finer, the coarser the particles of the carbonate the greater being the coloring effect of a given quantity of the chromate or bichromate, and vice versa. When the action consequent upon mixing or grinding together these ingredients in the manner above stated has ceased the liquid is poured off, and the chromic yellow is washed in as expeditious manner as possible, as a long-continued soaking in water will produce a reddish color from a partial decomposition of the chromate of lead. After the last washings have been expelled as completely as can be effected by pressure or other convenient means the paint is to be dried by a gentle heat.

Now, what I claim as my invention, and desire to secure by Letters Patent, is—

The method of using the carbonate of lead in the manufacture of chromic yellow, in the manner and for the purposes above set forth.

In testimony whereof I, the said RICHARD A. TILGHMAN, hereunto subscribe my name, in the presence of the witnesses whose names are hereto subscribed, on the 15th day of December, A. D. 1842.

R. A. TILGHMAN.

In presence of—
W. M. TILGHMAN,
B. C. TILGHMAN.